(12) United States Patent
Zettler

(10) Patent No.: US 6,597,893 B2
(45) Date of Patent: Jul. 22, 2003

(54) DATA CARRIER WITH CONTROLLABLE SUPPLY VOLTAGE GENERATION MEANS

(75) Inventor: Werner Zettler, St. Marein Im Muerztal (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 147 days.

(21) Appl. No.: 09/932,106

(22) Filed: Aug. 17, 2001

(65) Prior Publication Data

US 2002/0054653 A1 May 9, 2002

(30) Foreign Application Priority Data

Jul. 31, 2000 (EP) .................................. 00890239

(51) Int. Cl.[7] ................................................. H04B 5/00
(52) U.S. Cl. ........................................... 455/41; 455/73
(58) Field of Search .......................... 455/41, 73, 106; 342/44–51; 235/382

(56) References Cited

U.S. PATENT DOCUMENTS 6,480,699 B1 * 11/2002 Lovoi .......................... 455/41
6,531,957 B1 * 3/2003 Nysen .......................... 455/73
2002/0119751 A1 * 8/2002 Baumann et al. ............. 455/41

FOREIGN PATENT DOCUMENTS

WO     WO 9957681     * 11/1999

* cited by examiner

Primary Examiner—Nay Maung
(74) Attorney, Agent, or Firm—Steven R. Biren

(57) ABSTRACT

A data carrier (1) on which a carrier signal (TS) can be applied to an electric circuit (3), comprises supply voltage generation means (6) which are arranged for generating a DC supply voltage (U) that can be tapped from a supply tapping point (10) while use is made of the carrier signal (TS), and further includes control means (11) for controlling the DC supply voltage (U) in accordance with a controlled variable signal (CV) that represents the carrier signal (TS) occurring at a control means circuit point (20), and further includes decoupling means (49) with the aid of which the control means circuit point (20) and the supply circuit point (10) can be decoupled from each other.

16 Claims, 1 Drawing Sheet

DATA CARRIER WITH CONTROLLABLE SUPPLY VOLTAGE GENERATION MEANS

FIELD OF THE INVENTION

The invention relates to a data carrier comprising an electric circuit, which circuit has a circuit terminal for supplying a carrier signal and includes supply voltage generation means for generating a DC supply voltage while the carrier signal is used, and which has a supply circuit point from which the DC supply voltage can be tapped, and which includes control means for controlling the DC supply voltage in accordance with a controlled variable signal that occurs at a control means circuit point and represents the carrier signal.

The invention further relates to a circuit for a data carrier, which circuit has a circuit terminal for supplying a carrier signal and includes supply voltage generation means for generating a DC supply voltage while the carrier signal is used, and which has a supply circuit point from which the DC supply voltage can be tapped, and which includes control means for controlling the DC supply voltage in accordance with a controlled variable signal that occurs at a control means circuit point and represents the carrier signal.

BACKGROUND OF THE INVENTION

Such a data carrier of the type defined in the opening paragraph, having a circuit of the type defined in the second paragraph has been marketed by the applicants and is therefore known.

With the known data carrier, a carrier signal, that is received by transmission means and is delivered by transmitter means of a communication arrangement is applied to the circuit via the circuit terminal of the data carrier circuit and is rectified by rectifier means and the rectified signal is applied to a storage capacitor. The rectifier means and the capacitor form supply voltage generation means which are arranged for generating a DC supply voltage and have the supply circuit point from which the DC supply voltage can be tapped that is used for supplying power to first useful circuit components connected to the supply circuit point. Furthermore, the control means are connected to this supply circuit point. The control means recover from the DC supply voltage a controlled variable signal that appears on the control means circuit point and represents the carrier signal via the DC supply voltage derived by the carrier signal. The control means are arranged for controlling the DC supply voltage in accordance with the controlled variable signal, while the rectifier means are loaded in dependence on the controlled variable signal when the control is performed by a field effect transistor. Also the carrier signal is indirectly loaded or controlled, respectively, via the loading of the rectifier means. The known data carrier, however, also includes second useful circuit components which are to be connected directly to the circuit terminal, as is the case, for example, with a load modulation means which is provided for modulating the load of the carrier signal.

The known data carrier has a problem that the control means have a control dynamic that is disadvantageously slowed down due to the storage capacitor connected to the supply circuit point, so that a rapid control of the DC supply voltage or a rapid indirect control of the carrier signal respectively, is not guaranteed when the intensity of the carrier signal varies rapidly, as this would be necessary, for example, for an application in which the data carrier is present in the vicinity of the transmitter means of a communication station that was not transmitting at that moment and during its presence is activated to transmit the carrier signal. In that case, due to the slowed-down control dynamic of the supply voltage control on the circuit terminal there are significantly higher voltage values than the value of the DC supply voltage appearing on the supply voltage circuit point. In consequence, this means that the second useful circuit components, compared to the supply voltage generation means and the first useful circuit components are to have a higher voltage stability. When an integrated circuit is manufactured, however, this fact is the cause of a considerable technical disadvantage, because a second manufacturing process is to be used for the second useful circuit components, which second process differs from a first manufacturing process of the supply voltage generation means and the first useful circuit components, so that the manufacture of the data carrier is made considerably more expensive.

BRIEF SUMMARY OF THE INVENTION

It is an object of the invention to resolve the problems defined above with a data carrier in accordance with the type defined in the opening paragraph and with a circuit in accordance with the type defined in the second paragraph and provide an improved data carrier and an improved circuit.

The object defined above is achieved with a data carrier of the type defined in the opening paragraph in that decoupling means are provided with the aid of which the supply circuit point and the control means circuit point can be decoupled from each other.

The object defined above is furthermore achieved with a circuit of the type defined in the second paragraph in that decoupling means are provided with the aid of which the supply circuit point and the control means circuit point are decoupled from each other.

Providing the characteristic features according to the invention advantageously achieves that with the aid of the control means, unaffected by the supply voltage generation means and unaffected by the first useful circuit components, the carrier signal that occurs on the circuit terminal and thus also the supply voltage that can be tapped from the supply circuit point can be controlled. Furthermore, the advantage is obtained that on the circuit terminal no significantly higher voltage values occur than the voltage value of the DC supply voltage occurring on the supply voltage circuit point. This further offers the advantage that the second useful circuit components may have a voltage stability that is identical with the first useful circuit components and, therefore, a single manufacturing process can be used for manufacturing the circuit.

Providing the characteristic features according to the invention and as defined in claim 2 or claim 10, respectively, advantageously makes a reliable decoupling possible of the supply circuit point from the control means circuit point. Furthermore, the advantage is obtained that the diode configuration is also used as a rectifier for supplying power to the capacitor of the supply voltage generation means and that the diode configuration only needs to be dimensioned for power values that are low compared to the control means. This allows a highly surface-area saving realization of the decoupling means when an integrated circuit is manufactured.

Providing the characteristic features according to the invention and as defined in claim 3 or claim 11, respectively, advantageously makes it possible that separately structured load modulation means for modulating the load of the carrier signal can be omitted, because only the control means are used for modulating the load and that, as a result, surface area is definitely saved when an integrated circuit is manufactured, because the load modulation means dimensioned for high-current values are formed completely with the parts of the control means already dimensioned for high-currents. Furthermore, the advantage is obtained that a saturation behavior typical of the control means can be used for limiting an intensity of the load modulation of the carrier signal. This furthermore offers the advantage that with the data carrier a load modulation of the carrier signal can be generated, whose intensity is variable in dependence on an intensity of the received carrier signal. As a result, the advantage is furthermore obtained that receiving means of a communication arrangement can be prevented from being overmodulated, which receiving means receive the load-modulated carrier signal with the aid of the data carrier.

Providing the characteristic features according to the invention and as defined in claim 4 or claim 12, respectively, advantageously achieves that for the purpose of modulating the load of the carrier signal with the aid of the load modulation means formed by parts of the control means, a modulation signal received by the control means is used for controlling the value of the controlled variable signal, so that the controlled variable signal, which the control means use for controlling, represents the modulation signal which the load modulation means use for modulating the load.

Providing the characteristic features according to the invention and as defined in claim 5 or claim 13, respectively, advantageously achieves that a first value of the controlled variable signal and a second value of the controlled variable signal can be generated reliably and reproducibly.

Providing the characteristic features as defined in claim 6 or claim 14, respectively, advantageously achieves that the controlled variable signal can be generated in a simple and disturbance-free manner.

In a data carrier according to the invention and a circuit for the data carrier according to the invention, the tapping means can be formed, for example, by an electronic reversing switch. However, it has proved to be advantageous to provide the characteristic features as claimed in claim 7 or claim 15, respectively, because in this way a full integration of the circuit is possible. Furthermore, the advantage is obtained that it is possible in a very simple manner to drive the tapping means with the modulation signal preferably available in digital form.

With a data carrier according to the invention and a circuit according to the invention, providing the characteristic features according to the invention and as defined in claim 8 or claim 16, respectively, has proved to be advantageous because, as a result, a highly cost-effective manufacture in an associated large number is guaranteed.

The aspects defined above and further aspects of the invention become evident from the examples of embodiment to be described hereinafter and will be explained with reference to these examples of embodiment.

These and other aspects of the invention are apparent from and will be elucidated with reference to the embodiment(s) described hereinafter.

DETAILED DESCRIPTION OF THE INVENTION

Figure 1:
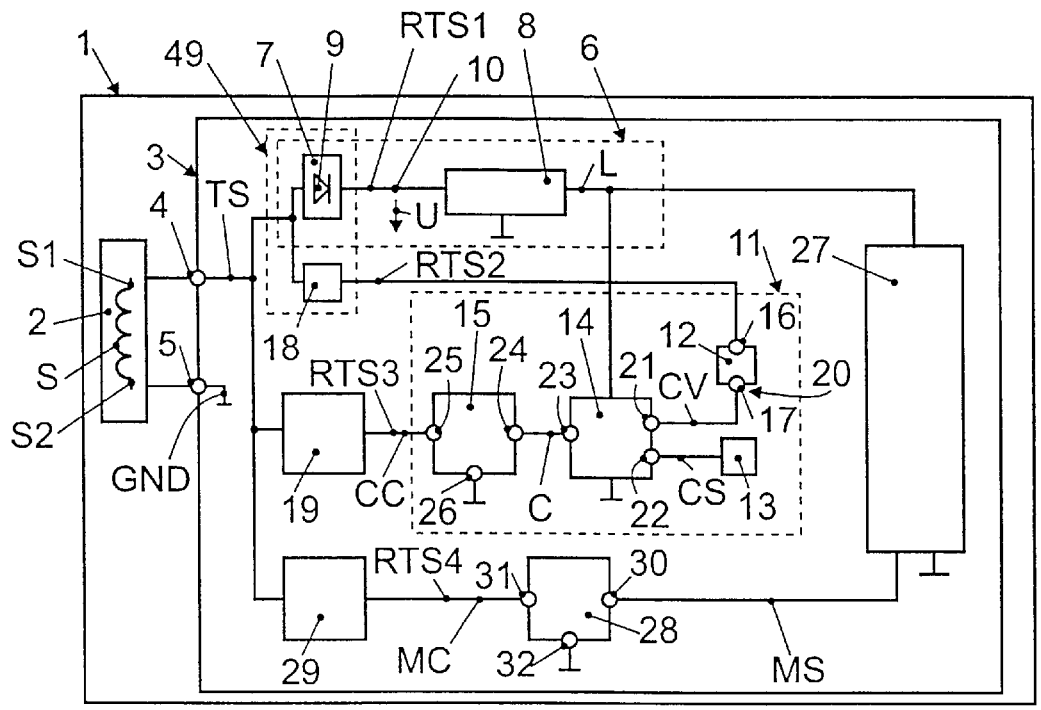
FIG. 1 shows in a diagrammatic way in the form of a block diagram a data carrier and a circuit for the data carrier according to a first example of embodiment of the invention.

FIG. 1 shows a data carrier 1 which is arranged for contactless communication with a communication arrangement not shown in FIG. 1. The data carrier 1 comprises transmission means 2 and an electric circuit 3. The transmission means 2 are formed by a coil S which has a first coil end S1 and a second coil end S2. The electric circuit 3 is arranged as an integrated circuit and has a first circuit terminal 4 and a second circuit terminal 5. To the first circuit terminal 4 is connected the first coil end SI and to the second circuit terminal 5 is connected the second coil end S2. The transmission means 2, when in operation, are arranged for contactless reception of a carrier signal TS, while this received carrier signal TS can be applied to the electric circuit 3 via the first circuit terminal 4. The second circuit terminal 5 is connected to a reference potential GND of the electric circuit, so that the carrier signal TS can be tapped from the first circuit terminal 4 opposite to the reference potential GND of the electric circuit 3.

The circuit 3 includes supply voltage generation means 6 which are connected to the first circuit terminal 4, so that the carrier signal TS can be applied to these means 6. The supply voltage generation means 6 include first coupling means 7 and energy storage means 8. The first coupling means 7 are used for coupling the energy storage means 8 to the first circuit terminal 4. The first coupling means 7 are arranged as a first diode configuration 9, the first diode configuration being formed by a first bridge rectifier circuit not shown in FIG. 1. With the aid of the first diode configuration 9, the carrier signal TS is rectified and a first rectified carrier signal RTS1 is delivered to the energy storage means 8. The energy storage means 8 are realized by a capacitor not shown in the Figure, which is used for smoothing the ripple of the first rectified carrier signal RTS1 and for storing energy. The supply voltage generation means 6 further have a supply circuit point 10 from which the first carrier signal RTS1, which is rectified and whose ripple is smoothed, can be tapped as a DC supply voltage U. Accordingly, the supply voltage generation means 6 are arranged for generating the DC supply voltage U while use is made of the carrier signal TS. The supply voltage generation means 6 are further arranged for delivering the DC supply voltage U, which can be tapped from the supply circuit point 10. In connection with the supply voltage generation means 6 it may be observed that also a longitudinal controller may be provided, which stabilizes a residual ripple of the first rectified and smoothed carrier signal RTS1 after the ripple of the first rectified carrier signal RTS1 has been smoothed, and that the DC supply voltage U can be supplied by the supply voltage generation means 6 via the longitudinal controller.

The circuit 3 includes control means 11 which include a controlled variable signal generator 12 and a correcting variable signal generator 13 and a control signal determining stage 14 and a control signal converter stage 15. The controlled variable signal generator 12 has a generator input 16 and a generator output 17. The circuit 3 further includes second coupling means 18 for coupling the first circuit terminal 4 to the generator input 16. The second coupling means 18 are formed by a second diode configuration not shown in FIG. 1, which in the present case is arranged as a second bridge rectifier circuit so that, in accordance with the carrier signal TS, a second rectified carrier signal RTS2 can be delivered to the controlled variable signal generator 12. The circuit 3 further includes third coupling means 19 for coupling the first circuit terminal 4 to the control signal converter stage 15. The third coupling means 18 are formed by a third diode configuration not shown in the FIG. 1, which in the present case is realized as a third bridge rectifier circuit, so that in accordance with the carrier signal TS, the third coupling means 19 can deliver a third rectified carrier signal RTS3 to the control means 11.

The controlled variable signal generator 12 is arranged for generating a controlled variable signal CV, which controlled variable signal CV can be delivered via the generator output 17. The generator output 17 forms a control means circuit point 20 at which, in operation, the controlled variable signal CV occurs, which represents the carrier signal TS.

The correcting variable signal generator 13 is arranged for generating and delivering a correcting variable signal CS.

The control signal determining stage 14 has a first determining stage input 21 and a second determining stage input 22 and a determining stage output 23. At the first determining stage input 21, the control signal determining stage 14 can be supplied with the controlled variable signal CV. At the second control stage input 22 the control signal determining stage 14 can be supplied with the correcting variable signal CS. The control signal determining stage 14 is arranged for determining a control signal C representing the difference between the controlled variable signal CV and the correcting variable signal CS, which control signal C can be applied from the determining stage output 23 to the control signal converter stage 15. The control signal determining stage 14 may be generally arranged as a differential amplifier. In the present case the control signal determining stage 14, however, is formed by an operational amplifier not shown in the FIG. 1, whereas the first determining stage input 21 is formed by the non-inverting input of the operational amplifier and the second determining stage input 22 by the inverting input of the operational amplifier. The output of the operational amplifier forms the determining stage output 23. The control signal determining stage 14, or the operational amplifier forming the control signal determining stage 14, respectively, is supplied, in operation, with the DC supply voltage U.

The control signal converter stage 15 has a first converter stage input 24 and a second converter stage input 25 and a converter stage output 26. The control signal converter stage 15 can be supplied with the control signal C via the first converter stage input 24. The converter stage output 26 is connected to the reference potential GND. The second converter stage input 25 is connected to the third coupling means 19. The control signal converter stage 15 has a resistor not shown in FIG. 1 but changeable by the control signal C between the second converter stage input 25 and the converter stage output 26, so that the control signal converter stage 15 is arranged for generating a control current CC changeable in accordance with the control signal C between the first circuit terminal 4 and the converter stage output 26 connected to the reference potential GND, the control current CC flowing through the third coupling means 19 and the first resistor. The variable control current CC caused by the control signal converter stage 15 causes via the third coupling means 19 a changeable smoothing to take place of the applied carrier signal TS in accordance with the control signal C.

The second coupling means 18, the control means 11 and the third coupling means 19 form a control loop. The carrier signal TS occurring on the first circuit terminal 4 can be directly controlled by the control means 11. Since the first coupling means 7 couple the first circuit terminal 4 to the supply circuit point 10, the control means also control the DC supply voltage U in accordance with the controlled variable signal CV occurring at the control means circuit point 20 and representing the carrier signal TS. Accordingly, with the aid of the first coupling means 7, the DC supply voltage U can be indirectly controlled. The first coupling means 7 and the second coupling means 18 form decoupling means 49 for decoupling the supply circuit point 10 and the control means circuit point 20 from each other. This offers the advantage that the carrier signal TS can be directly controlled by the control means 11 in accordance with the controlled variable signal CV occurring at the control means circuit point 20 unaffected by the DC supply voltage U.

The control signal converter stage 15 or the changeable first resistor, respectively, between the converter stage input 25 and the converter stage output 26 is in the present case formed by a first field effect transistor not shown in the FIG. 1, of which a control electrode (gate) forms the first converter stage input 24 and a first main electrode (drain) forms the second converter stage input 25 and a second main electrode (source) forms the converter stage output 26. The third coupling means 19 and the control signal converter stage 15 form a first high-current loop, because the control current CC which, in operation, flows through the third coupling means 19 and through the control signal converter stage 15 in the direction of the reference potential GND may be considerably higher than the current flowing in the operating second coupling means 18 or in the operating first coupling means 7.

The circuit 3 further includes data processing means 27 and load modulation means 28 and fourth coupling means 29. The data processing means 27 are connected, on the one hand, via a supply line L, to the supply circuit point 10 and, on the other hand, to the reference potential GND. Therefore, in operation, the data processing means 27 can be supplied with the DC supply voltage U. The data processing means 27 are realized by a hardwired logic circuit and by storage means. The storage means may be, for example, an EEPROM. In this connection, however, it may be observed that the data processing means 27 may also be realized by a microprocessor while the microprocessor also includes storage means. The data processing means 27 are arranged for generating and delivering a modulation signal MS to the load modulation means 28, while the modulation signal MS may have a stable state and a modulation state.

The fourth coupling means 29 are provided for coupling the first circuit terminal 4 to the load modulation means 28. The fourth coupling means are formed by a fourth diode configuration not shown in FIG. 1, which in the present case is arranged as a fourth bridge rectifier circuit, so that in accordance with the carrier signal TS a fourth rectified carrier signal RTS4 can be supplied to the load modulation means 28 by the fourth coupling means 29.

The load modulation means 28 have a first central modulation input 30 and a second central modulation input 31 and a central modulation output 32. The second central modulation input 31 is connected to the fourth coupling means 29. The central modulation output 32 is connected to the reference potential GND. The first central modulation input 30 is connected to the data processing means 27 and arranged for receiving the modulation signal MS. The load modulation means 28 include between the second central modulation input 31 and the central modulation output 32 a second resistor, which is not shown in FIG. 1, but can be changed in accordance with the modulation signal MS, so that the load modulation means 28 are arranged for generating a modulation current MC that can be changed in accordance with the modulation signal MS. The changeable modulation current MC caused by the load modulation means 28 forms, via the fourth coupling means 29, a load of the applied carrier signal TS in accordance with the modulation signal MS. The load modulation means 28 are accordingly arranged for receiving the modulation signal MS and for modulating the load of the applied carrier signal TS in accordance with the modulation signal MS. The changeable second resistor between the second central modulation input 31 and the central modulation output 32 is realized via a second field effect transistor, of which a first control electrode (gate) forms the first central modulation input 30 and a first main electrode (drain) forms the second central modulation input 31 and a second main electrode (source) forms the central modulation output 32.

The fourth coupling means 29 and the load modulation means 28 form a second high-current loop, because the modulation current MC compared to the currents flowing in the second coupling means 18 and the first coupling means 7 can adopt a comparatively high value.

In the present case the transmission means 2 are arranged for the inductive coupling with the communication arrangement; however, it is also possible to use transmission means 2 suitable for capacitive coupling. Furthermore it is observed that parts of the transmission means 2 may form parts of the electric circuit 3. It is further observed that the electric circuit 3 also includes receiving means which are not shown, which are formed for receiving data signals, while the data signals can be transmitted to the data carrier 1 via the carrier signal TS. The receiving means include demodulation means and are arranged for delivering the received data signals to the data processing means 27.

Figure 2:
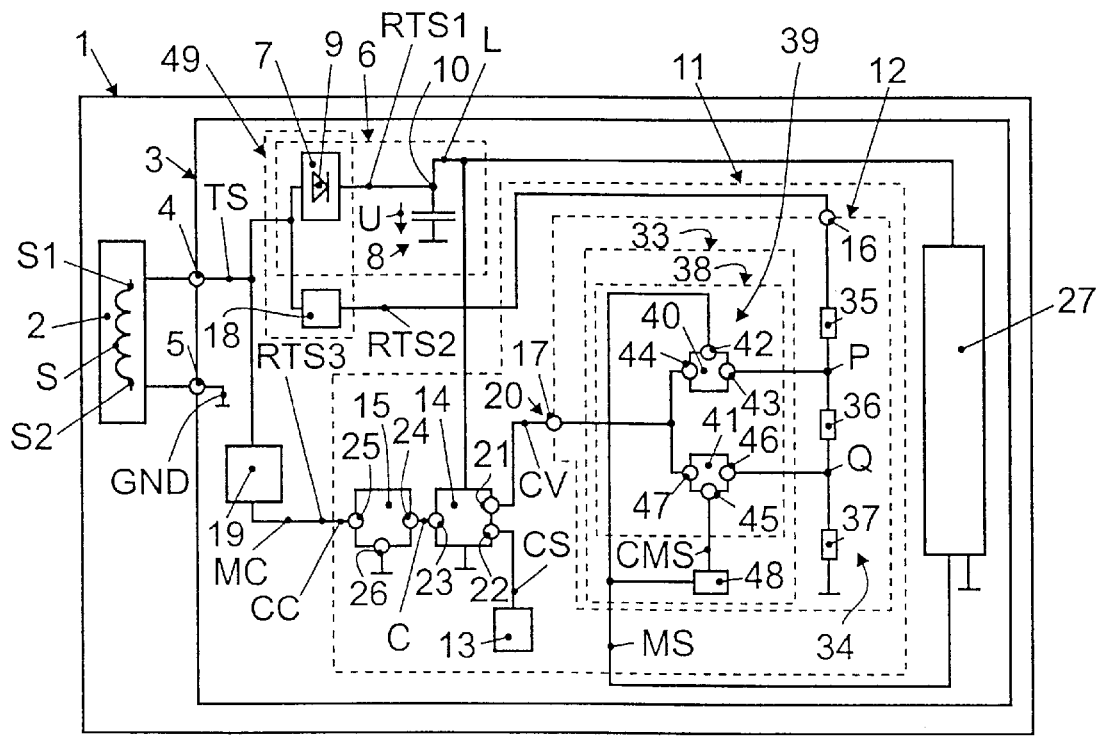
FIG. 2 shows in a manner similar to FIG. 1 a data carrier and a circuit for the data carrier according to a second example of embodiment of the invention.

In the data carrier 1 shown in FIG. 2 are realized, as distinct from the data carrier 1 shown in FIG. 1, the energy storage means 8 by means of a capacitor C, which capacitor is connected between the supply circuit point 10 and the reference potential GND. Furthermore, the electric circuit 3 has only a single high-current loop, that is, the first high-current loop, which renders a second high-current loop redundant. Furthermore, the fourth coupling means 29 are formed by the third coupling means 19.

Furthermore, for the data carrier 1 shown in FIG. 2, modulation means 28 are formed with the aid of parts of the control means 11, that is to say, with the aid of the control signal converter stage 15. The control means 11 are in this case arranged for receiving the modulation signal MS and for modulating the load of the carrier signal TS in accordance with the modulation signal MS. For this purpose, the controlled variable signal generator 12 comprises control means 33 for receiving the modulation signal MS. Furthermore, the controlled variable signal generator 12 includes a voltage divider 34 which is formed by a third resistor 35, a fourth resistor 36 and a fifth resistor 37. The third resistor 35 is connected to the generator input 16 and to the fourth resistor 36. The fourth resistor 36 is connected to the fifth resistor 37 and the fifth resistor 37 is connected to the reference potential GND. The voltage divider 34 further has a first tapping point P between the third resistor 35 and the fourth resistor 36 and a second tapping point Q between the fourth resistor 36 and the fifth resistor 37.

The control means 33 are arranged for controlling the controlled variable signal CV occurring on the generator output 17 and have tapping means 38 for this purpose. The tapping means 38 are arranged for the tapping of the controlled variable signal CV from the first tapping point P or the second tapping point Q, respectively, in dependence on the modulation signal MS. The tapping means 38 are formed by a transistor configuration 39, which comprises a third field effect transistor 40 and a fourth field effect transistor 41. The third field effect transistor 40 has a control electrode 42 to which can be directly applied the modulation signal MS, and a first main electrode 43 (drain) which is connected to the first tapping point P, and a second main electrode 44 (source) which is connected to the generator output 17. The fourth field effect transistor 41 has a control electrode 45 (gate) and a first main electrode 46 (drain), which is connected to the second tapping point Q, and a second main electrode 47 (source), which is connected to the generator output 17.

The control means 33 further include an inverting stage 48 to which can be applied the modulation signal MS and which is arranged for generating and delivering a complementary modulation signal CMS. The control electrode 45 of the fourth field effect transistor 41 is connected to the inverting stage 48. The control means 33 then achieve that when the modulation signal MS is in the modulation mode, the third field effect transistor 40 is turned on and the fourth field effect transistor 41 is turned off and that, when the modulation signal MS is in the state of rest, the third field effect transistor 40 is turned off and the fourth field effect transistor 41 is turned on. Accordingly, in dependence on the modulation signal MS, the generator output 17 is connected either to the first tapping point P or to the second tapping point Q.

In the following the way of operation of the data carrier 1 is explained with reference to a first example of embodiment for the data carrier 1 as shown in FIG. 2.

According to the first example of embodiment is described how the DC supply voltage U is controlled when a modulation signal occurs which is in a state of rest. It is assumed that the correcting variable signal CS has a voltage value Ucs which in the present case is about 1.22 volts. Furthermore, it is assumed that an overall resistance of the voltage divider 34 is twice as large as a tapping resistance formed by the third resistor 37. In accordance with the state of rest of the modulation signal MS, the controlled variable signal CV is tapped from the second tapping point Q of the voltage divider 34 by the tapping means 38. Furthermore it is assumed that the data carrier 1 is inside a communication range of a communication apparatus sending the carrier signal TS and is moved from a minimum distance to the communication apparatus to a maximum distance to the communication apparatus. The minimum distance is defined, so that the transmission means 2 of the data carrier 1 are arranged in close proximity to the communication apparatus. The maximum distance to the communication apparatus is defined so that the transmission means 2 of the data carrier 1 are so remote from the communication apparatus that a reliable generation of the DC supply voltage U having a nominal value of about twice Ucs, thus 2*Ucs is still possible.

When the data carrier 1 moves from the minimum distance to the maximum distance, a value of the carrier signal TS that can be tapped from the first circuit terminal 4 changes from a maximum to a minimum. The control means 11 now control the carrier signal TS occurring at the first circuit point 4, so that a voltage value of 2*Ucs can be taken from the generator input 16. During the control operation the control signal C adopts a maximum value for the maximum value of the received carrier signal TS, in correspondence with which a maximum value of the control current CC is generated by the control signal converter stage 15. In consequence, the applied carrier signal TS is subjected to maximum smoothing. During the control operation a minimum value of the control signal C occurs for the minimum value of the received carrier signal TS, for which a minimum value of the control current CC is generated by the control signal converter stage 15. In consequence, the applied carrier signal TS is subjected to minimum smoothing.

In this respect it may be observed that the control means 11, thus the voltage divider 34, the correcting variable signal generator 13, the control signal determining stage 14 and also the control signal converter stage 15 tuned to the control signal C which can be generated by the control signal determining stage 14, are dimensioned so that for any distance between the data carrier 1 and the communication arrangement within the communication range of the communication arrangement, it is ensured that the controlled variable signal CV can adopt the voltage value Vcs of the correcting variable signal CS as a result of the control.

While assuming that a voltage drop on the second coupling means 18 and a voltage drop on the first coupling means 7 are equally large, also the indirect controlling of the DC supply voltage U to a value of 2*Ucs is accordingly the result.

Providing the decoupling means 49 advantageously achieves that the applied carrier signal TS can be controlled with the aid of the control means 11 or with the aid of the control loop, unaffected by the supply voltage generation means 6. This is particularly important when it is assumed that the data carrier 1 is situated in the immediate proximity of a non-sending communication arrangement and that the communication arrangement starts sending in this position of the data carrier 1. In this case the applied carrier signal TS could adopt values that are too high for at least part of the circuit 3, which could lead to a damaging of parts of the circuit 3 or of the entire circuit 3. By providing the decoupling means 49, however, a smoothing-free control of the control means 11 is made possible, so that the applied carrier signal TS can never exceed the maximum values that are allowed for the circuit 3. This further offers the advantage that the transistors forming the control signal converter stage 15 and the modulation means 28 may have identical maximum voltage values and that the transistors can be manufactured in an identical manufacturing process with the manufacturing process of the further circuit 3.

In the following the operation of the data carrier 1 is explained with reference to a second example of embodiment for the data carrier 1 shown in FIG. 2.

In accordance with the second example of embodiment it is assumed that the data carrier 1 is moved to the communication arrangement from the maximum distance to the minimum distance. Furthermore, it is assumed that when the data carrier 1 is moved towards the communication arrangement, the modulation signal MS changes from the rest mode to the modulation mode and back to the rest mode at arbitrary instants.

First it is assumed that the data carrier 1 is close to the maximum distance. When the modulation signal MS is in a modulation state, the controlled variable signal CV is tapped from the first tapping point P, in contrast to when the modulation signal MS is in a rest state, so that there is an instantaneous voltage value on the control means circuit point 20 that is higher than a settled voltage value Ucs. In consequence, a control signal C is formed by the control signal determining stage 14 based on the difference between the controlled variable signal CV and the correcting variable signal CS, so that the control current CC is increased during the modulation period of the modulation signal MS and that, as a result, the voltage value on the generator input 16 for the period of the modulation state adopts a voltage value of about 2*Ucs so as to obtain again a voltage value of Ucs at the control means circuit point 20. In accordance with the changed control current CC there is an effective load during the modulation state, which load exceeds the attenuation of the rest state of the applied carrier signal TS on the first circuit terminal 4, which load can be detected in the communication arrangement as modulation of the load of the carrier signal TS. Furthermore, it is to be observed that the modulation state of the modulation signal MS only occurs during brief time intervals so that a lasting change of the DC supply voltage U caused by the storage effect of the energy storage means 8 is avoided. Furthermore, the decoupling means 49 offer the advantage that the attenuated effect of the energy storage means 8 at the supply voltage circuit point 10 does not also have an effect on the control means circuit point 20, so that an error-free modulation of the load is possible.

In the following it is assumed that the data carrier 1 is moved from the maximum distance to the minimum distance. As a consequence of the rising value of the received carrier signal TS when the communication arrangement comes nearer, also the value of the control signal C rises when the modulation signal MS is in the state of rest. The value of the control signal C is therefore ever more increased to its maximum when the data carrier 1 moves towards the communication arrangement and when the modulation signal MS is in the modulation state, which maximum value ideally corresponds to approximately 2*Ucs. This maximum value of the control signal C is reached exactly with a nominal distance between the data carrier 1 and the communication arrangement, which nominal distance lies between the minimum distance and the maximum distance. Accordingly, with a data carrier 1 lying in the area between the nominal distance and the maximum distance, there is a constant voltage deviation on the circuit terminal 4, because in this range, when there is a change from the state of rest of the modulation signal MS to the modulation state, the control signal C can always perform a control signal deviation to control the voltage value occurring on the control means circuit point 20 to a value of Ucs. When there is a nominal distance, this requires a maximum current deviation as a difference between the control current CC and the modulation current MC.

When the data carrier 1 comes closer to the communication arrangement from the nominal distance to the minimum distance, however, when the state of rest of the modulation signal MS occurs, the control signal C has a value that is higher than the nominal value of the control signal C occurring at the nominal distance, so that when the modulation signal MS is in the modulation state, the necessary maximum control signal deviation can no longer be effected. In that case the control signal C generated when the modulation signal MS is in the modulation state is saturated, while the saturation value of the control signal C is given by a value of about 2*Ucs.

When the data carrier 1 is moved towards the communication arrangement, the available control signal deviation continuously decreases. Accordingly, also in comparison to the maximum current deviation, there is a reduced current deviation as a difference between the control current CC and the modulation current MC, so that a smaller load of the carrier signal CS occurring at the first circuit terminal 4 occurs compared to the load of the carrier signal TS occurring in the area between the nominal distance and the maximum distance. When the data carrier 1 comes nearer to the communication arrangement, starting from the nominal distance to the minimum distance, the load of the carrier signal TS continuously decreases, so that, although the data carrier 1 comes nearer to the communication arrangement, a limitation of the intensity of the load of the load-modulated carrier signal TS, which limitation can be ascertained by the communication arrangement, is obtained as a consequence of the saturation of the control signal C and, therefore, a possible overmodulation of the load modulation detection means of the communication arrangement for each position of the data carrier 1 between the minimum distance and the maximum distance to the communication arrangement may reliably be avoided.

What is claimed is:

1. A data carrier (1) comprising an electric circuit (3)
   which circuit has a circuit terminal (4) for supplying a carrier signal (TS), and includes supply voltage generation means (6) for generating a DC supply voltage (U) while the carrier signal (TS) is used, and
   which has a supply circuit point (10) from which the DC supply voltage (U) can be tapped, and
   which includes control means (11) for controlling the DC supply voltage (U) in accordance with a controlled variable signal (CV) that occurs at a control means circuit point (20) and represents the carrier signal (TS),
   characterized in that decoupling means (49) are provided with the aid of which the supply circuit point (10) and the control means circuit point (20) can be decoupled from each other.

2. A data carrier (1) as claimed in claim 1, characterized in that the decoupling means (49) are formed by a diode configuration (9).

3. A data carrier (1) as claimed in claim 1, characterized
   in that load modulation means (28) are provided for receiving a modulation signal (MS) and for modulating the load of the carrier signal (TS) in accordance with the modulation signal (MS) and
   in that the load modulation means (28) are formed by parts of the control means (11) and in that the control means (11) are arranged for receiving the modulation signal (MS) and for modulating the load of the carrier signal (TS) in accordance with the modulation signal (MS).

4. A data carrier (1) as claimed in claim 3, characterized in that a controlled variable signal generator (12) is provided for generating the controlled variable signal (CV) and
   in that the controlled variable signal generator (12) has a generator input (16) which is connected to the circuit terminal (4) and
   in that the controlled variable signal generator (12) has a generator output (17) for supplying the controlled variable signal (CV) and which forms the control means circuit point (20) and in that in the controlled variable signal generator (12) are included control means (33) for receiving the modulation signal (MS) and for controlling the controlled variable signal (CV) in accordance with the modulation signal (MS).

5. A data carrier (1) as claimed in claim 4, characterized in that the controlled variable signal generator (12) is formed by a voltage divider (34) and in that the voltage divider (34) has at least a first tapping point (P) and a second tapping point (Q).

6. A data carrier (1) as claimed in claim 5, characterized in that the control means (33) are formed by tapping means (38) for tapping the controlled variable signal (CV) from the first tapping point (P) of the voltage divider (34) or from the second tapping point (Q) of the voltage divider (34) in accordance with the modulation signal (MS).

7. A data carrier (1) as claimed in claim 6, characterized in that the tapping means (38) are formed by a transistor configuration (39).

8. A data carrier as claimed in claim 1, characterized in that the electric circuit (3) of the data carrier (1) is arranged as an integrated circuit.

9. A circuit (3) for a data carrier
   which has a circuit terminal for supplying a carrier signal (TS) and
   which includes supply voltage generation means (6) for generating a DC supply voltage (U) while the carrier signal (TS) is used and
   which includes a supply circuit point (10) from which the DC supply voltage (U) can be tapped and
   which includes control means (11) for controlling the DC supply voltage (U) in accordance with a controlled variable signal (CV) that occurs at a control means circuit point (20) and represents the carrier signal (TS),
   characterized in that decoupling means (49) are provided by which the supply circuit point (10) and the control means circuit point (20) can be decoupled from each other.

10. A circuit (3) as claimed in claim 9, characterized in that the decoupling means (49) are formed by a diode configuration (9).

11. A circuit (3) as claimed in claim 9, characterized
    in that load modulation means (28) are provided for receiving a modulation signal (MS) and modulating the load of the carrier signal (TS) in accordance with the modulation signal (MS) and
    in that the load modulation means (28) are formed by parts of the control means (11) and in that the control means (11) are arranged for receiving the modulation signal (MS) and for modulating the load of the carrier signal (TS) in accordance with the modulation signal (MS).

12. A circuit (3) as claimed in claim 1, characterized
    in that a controlled variable signal generator (12) is provided for generating the controlled variable signal (CV) and
    in that the controlled variable signal generator (12) has a generator input (16) which is connected to the circuit terminal (4) and
    in that the controlled variable signal generator (12) has a generator output (17) for supplying the controlled variable signal (CV) and which forms the control means circuit point (20) and in that in the controlled variable signal generator (12) are included control means (33) for receiving the modulation signal (MS) and for controlling the controlled variable signal (CV) in accordance with the modulation signal (MS).

13. A circuit (3) as claimed in claim 12, characterized
    in that the controlled variable signal generator (12) is formed by a voltage divider (34) and in that the voltage divider (34) has at least a first tapping point (P) and a second tapping point (Q).

14. A circuit (3) as claimed in claim 13, characterized in that the control means (33) are formed by tapping means (38) for tapping the controlled variable signal (CV) from the first tapping point (P) of the voltage divider (34) or from the second tapping point (Q) of the voltage divider (34) in accordance with the modulation signal (MS).

15. A circuit (3) as claimed in claim 14, characterized in that the tapping means (38) are formed by a transistor configuration (39).

16. A circuit (3) as claimed in claim 9, characterized in that the circuit (3) is arranged as an integrated circuit.

* * * * *